US011274236B2

United States Patent
Auvil et al.

(10) Patent No.: US 11,274,236 B2
(45) Date of Patent: Mar. 15, 2022

(54) ONE-COMPONENT TOUGHENED EPOXY ADHESIVES CONTAINING A MIXTURE OF LATENT CURING AGENTS

(71) Applicant: DDP SPECIALTY ELECTRONIC MATERIALS US, LLC, Wilmington, DE (US)

(72) Inventors: Tyler Auvil, Auburn Hills, MI (US); Bindu Krishnan, Freeport, TX (US); Andreas Lutz, Galgenen (CH); Felix Koch, Freienbach (CH); Cody Clinton, Freeport, TX (US)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 131 days.

(21) Appl. No.: 16/482,925

(22) PCT Filed: Feb. 19, 2018

(86) PCT No.: PCT/US2018/018599
§ 371 (c)(1),
(2) Date: Aug. 1, 2019

(87) PCT Pub. No.: WO2018/156450
PCT Pub. Date: Aug. 30, 2018

(65) Prior Publication Data
US 2019/0352549 A1    Nov. 21, 2019

Related U.S. Application Data

(60) Provisional application No. 62/463,704, filed on Feb. 26, 2017.

(51) Int. Cl.
*C09J 163/00* (2006.01)
*B32B 7/12* (2006.01)
*C08G 59/40* (2006.01)
*C08G 64/04* (2006.01)
*C09J 109/00* (2006.01)

(52) U.S. Cl.
CPC .............. *C09J 163/00* (2013.01); *B32B 7/12* (2013.01); *C08G 59/4021* (2013.01); *C08G 59/4035* (2013.01); *C08G 64/04* (2013.01); *C09J 109/00* (2013.01); *B32B 2250/02* (2013.01); *B32B 2255/02* (2013.01); *B32B 2255/06* (2013.01); *B32B 2255/10* (2013.01); *C09J 2203/00* (2013.01)

(58) Field of Classification Search
CPC ... B32B 2255/02; B32B 2255/10; B32B 7/12; B32B 2255/06; B32B 2250/02; C08G 59/4035; C08G 59/4021; C08G 64/04; C09J 109/00; C09J 163/00; C09J 2203/00
See application file for complete search history.

(56) References Cited

U.S. PATENT DOCUMENTS

| | | |
|---|---|---|
| 4,659,779 A | 4/1987 | Bagga et al. |
| 4,701,378 A | 10/1987 | Bagga et al. |
| 4,713,432 A | 12/1987 | Bagga et al. |
| 4,734,332 A | 3/1988 | Bagga et al. |
| 5,112,932 A | 5/1992 | Koenig et al. |
| 5,202,390 A | 4/1993 | Mulhaupt et al. |
| 5,278,257 A | 1/1994 | Mulhaupt et al. |
| 5,747,565 A | 5/1998 | Ono et al. |
| 7,615,595 B2 | 11/2009 | Lutz et al. |
| 8,062,468 B2 | 11/2011 | Finter et al. |
| 8,071,217 B2 | 12/2011 | Kramer et al. |
| 8,076,424 B2 | 12/2011 | Kramer et al. |
| 8,114,519 B2 | 2/2012 | Kramer et al. |
| 8,153,229 B2 * | 4/2012 | Kousaka ............ C08G 59/56 428/117 |
| 8,404,787 B2 | 3/2013 | Lutz et al. |
| 9,181,463 B2 | 11/2015 | Lutz et al. |
| 2005/0070634 A1 | 3/2005 | Lutz et al. |
| 2005/0209401 A1 | 9/2005 | Lutz et al. |
| 2006/0276601 A1 | 12/2006 | Lutz et al. |
| 2009/0264558 A1 | 10/2009 | Kramer et al. |
| 2010/0009196 A1 | 1/2010 | Kramer et al. |
| 2011/0297317 A1 | 12/2011 | Lutz et al. |
| 2014/0343228 A1 * | 11/2014 | Liu ................ C08G 59/40 525/119 |

FOREIGN PATENT DOCUMENTS

| | | |
|---|---|---|
| EP | 0197892 | 10/1986 |
| EP | 0308664 | 3/1989 |
| EP | 1498441 | 1/2005 |
| EP | 1916269 | 4/2008 |
| EP | 1916270 | 4/2008 |
| EP | 1916272 | 4/2008 |
| EP | 1916285 | 4/2008 |
| EP | 1728825 | 3/2010 |
| EP | 1896517 | 1/2016 |
| JP | 50-025700 | 3/1975 |
| JP | 6-184511 | 7/1994 |
| JP | 2010-150401 | 7/2010 |
| WO | 2005118734 | 12/2005 |
| WO | 2007003650 | 1/2007 |
| WO | 2010098950 | 9/2010 |
| WO | 2012091842 | 7/2012 |

* cited by examiner

OTHER PUBLICATIONS

JP2010-150401 Translation.
JP6-184511, Machine Translation.
JP50-025700, Machine Translation.

*Primary Examiner* — Vishal I Patel
(74) *Attorney, Agent, or Firm* — Hong Xu

(57) ABSTRACT

A one-component toughened epoxy-modified polyurethane and/or urea adhesive includes a mixture of dicyandiamide and a dihydrazide as curing agents. The mixture of curing agents permits the adhesive to be cured at lower temperatures while developing good adhesive and mechanical properties in the cured adhesive.

7 Claims, No Drawings

ONE-COMPONENT TOUGHENED EPOXY ADHESIVES CONTAINING A MIXTURE OF LATENT CURING AGENTS

This invention relates to one-component toughened epoxy adhesives and assembly processes that make use of those adhesives.

One-component, toughened epoxy structural adhesives are coming into widespread use in the manufacture of motor vehicles and other products. Their single-component formulation simplifies their use on automated assembly lines, as the need to store, meter and mix separate resin and curative components is avoided.

Because the epoxy resin and hardener are packaged together, a one-component adhesive must exhibit a latent cure. Curing cannot commence under ordinary conditions of storage and transportation, but instead must be delayed until the adhesive is exposed to specific curing conditions, which typically include an elevated temperature.

For this reason, one-component epoxy adhesives are generally formulated with a latent curing agent. Dicyandiamide is widely used for this purpose. Dicyandiamide is a solid material that is poorly soluble in most epoxy resins. It melts at a temperature above 200° C. Its high melting temperature and low solubility in epoxy resins contribute to its latency. The onset of exothermic curing in epoxy adhesives containing dicyandiamide typically is seen at temperatures of 165° C. or greater, and a curing temperature of at least 180° C. is usually needed to obtain adequate curing with full development of properties.

A somewhat lower curing onset temperature is desirable sometimes. A greater degree of curing can be obtained under a given set of curing conditions, which leads to better ultimate properties. Cure times can be reduced. Lower curing temperatures can be used, which has several advantages including lower energy use, less generation of volatile organic compounds and the ability to use the adhesive to bond substrates that cannot tolerate higher curing temperatures. When substrate materials having different coefficients of linear thermal expansion are being adhered, the lower curing temperature reduces the differences in shrinkage that are seen when the adhered assembly is cooled. This reduces stresses that otherwise could promote failure of the adhesive bond or deformation of the glued assembly.

The invention is in one aspect a one-component toughened epoxy adhesive comprising in admixture A) at least one non-rubber-modified epoxy resin, B) at least one toughening agent, C) at least one epoxy curing catalyst and D) a curing agent mixture that includes dicyandiamide and one or more dihydrazide compounds, the dicyandiamide and one or more dihydrazide compounds being present at a weight ratio of 1:99 to 99:1.

The adhesive composition of the invention exhibits surprisingly low curing onset temperatures. The curing onset temperature is often as low as about 140° C., which is 20-25° C. lower than that seen when either dicyandiamide or the dihydrazide compound is used by itself. The adhesive is nonetheless storage stable and cures to form strong bonds to a number of substrates. The cured adhesive may exhibit a higher glass transition temperature than do otherwise similar cured adhesives that contain only dicyandiamide or only the dihydrazide as the curing agent and are cured under the same conditions.

The invention is also a method for bonding two substrates, comprising forming a layer of the adhesive of the first aspect of the invention at a bondline between two substrates to form an assembly, and then curing the adhesive layer at the bondline by heating to a temperature of at least 130° C., to form a cured adhesive bonded to the two substrates at the bondline.

The invention is also a method for forming a bonded and coated assembly, comprising 1) forming a layer of the adhesive of the first aspect of the invention at a bondline between a first substrate and a second substrate to form an assembly that includes the first and second substrates each in contact with the adhesive composition at the bondline; then 2) immersing the assembly into a coating bath to form a layer of an uncured coating on at least a portion of an exposed surface of the assembly; and 3) heating the coated assembly from step 2) to a temperature of at least 140° C. to cure the adhesive to form a cured adhesive bonded to the substrates at the bondline and simultaneously cure the coating layer.

The adhesive contains at least one non-rubber-modified epoxy resin, by which it is meant that, prior to curing, the epoxy resin is not chemically bonded to a rubber as described below.

A wide range of epoxy resins can be used as a non-rubber-modified epoxy resin, including those described at column 2 line 66 to column 4 line 24 of U.S. Pat. No. 4,734,332, incorporated herein by reference. The epoxy resin should have an average of at least 1.8, preferably at least 2.0, epoxide groups per molecule. The epoxy equivalent weight may be, for example, 75 to 350, preferably 140 to 250 and in some embodiments 150 to 225. If a mixture of non-rubber-modified epoxy resins is present, the mixture should have an average epoxy functionality of at least 1.8, preferably at least 2.0, and an epoxy equivalent weight as in the previous sentence. More preferably each epoxy resin in the mixture has such an epoxy functionality and epoxy equivalent weight.

Suitable non-rubber-modified epoxy resins include diglycidyl ethers of polyhydric phenol compounds such as resorcinol, catechol, hydroquinone, biphenol, bisphenol A, bisphenol AP (1,1-bis(4-hydroxylphenyl)-1-phenyl ethane), bisphenol F, bisphenol K and tetramethylbiphenol; diglycidyl ethers of aliphatic glycols such as the diglycidyl ethers of $C_{2-24}$ alkylene glycols; polyglycidyl ethers of phenol-formaldehyde novolac resins (epoxy novolac resins), alkyl substituted phenol-formaldehyde resins, phenol-hydroxybenzaldehyde resins, cresol-hydroxybenzaldehyde resins, dicyclopentadiene-phenol resins and dicyclopentadiene-substituted phenol resins; and any combination of any two or more thereof.

Suitable epoxy resins include diglycidyl ethers of bisphenol A resins such as are sold by Olin Corporation under the designations D.E.R.® 330, D.E.R.® 331, D.E.R.® 332, D.E.R.® 383, D.E.R. 661 and D.E.R.® 662 resins.

Epoxy novolac resins can be used. Such resins are available commercially as D.E.N.® 354, D.E.N.® 431, D.E.N.® 438 and D.E.N.® 439 from Olin Corporation.

Other suitable non-rubber-modified epoxy resins are cycloaliphatic epoxides. A cycloaliphatic epoxide includes a saturated carbon ring having an epoxy oxygen bonded to two vicinal atoms in the carbon ring, as illustrated by the following structure:

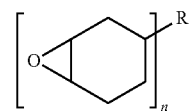

wherein R is hydrogen, an aliphatic, cycloaliphatic and/or aromatic group that may include heteroatoms such as oxygen, nitrogen, and n is a number from 1 to 10, preferably from 2 to 4. When n is 1, the cycloaliphatic epoxide is a monoepoxide. Di- or polyepoxides are formed when n is 2 or more. R preferably contains up to 10 carbon atoms. Mixtures of mono-, di- and/or polyepoxides can be used. Cycloaliphatic epoxy resins as described in U.S. Pat. No. 3,686,359, incorporated herein by reference, may be used in the present invention. Cycloaliphatic epoxy resins of particular interest are (3,4-epoxycyclohexyl-methyl)-3,4-epoxy-cyclohexane carboxylate, bis-(3,4-epoxycyclohexyl) adipate, vinylcyclohexene monoxide and mixtures thereof.

Other suitable epoxy resins include oxazolidone-containing compounds as described in U.S. Pat. No. 5,112,932. In addition, an advanced epoxy-isocyanate copolymer such as those sold commercially as D.E.R. 592 and D.E.R. 6508 (Olin Corporation) can be used.

The non-rubber-modified epoxy resin preferably includes a diglycidyl ether of a bisphenol, which may be advanced, or mixture thereof with up to 10 percent by weight of another type of non-rubber-modified epoxy resin. The most preferred epoxy resins are diglycidyl ethers of bisphenol A or bisphenol F, which may be advanced. These can have average epoxy equivalent weights of from about 170 to 600 or more, preferably from 225 to 400.

The toughener (component B) is a material having at least one glass transition temperature (by differential scanning calorimetry) of −20° C. or lower. Among the suitable tougheners are:

B-1) one or more reactive urethane group- and/or urea group-containing polyethers having a number average molecular weight of up to 35,000, at least one polyether or diene rubber segment having a weight of at least 1000 atomic mass units, and capped isocyanate groups;

B-2) one or more core-shell rubbers; and

B-3) one or more rubber-modified epoxy resins.

B-1 type tougheners are described, for example, in U.S. Pat. Nos. 5,202,390, 5,278,257, WO 2005/118734, WO 2007/003650, WO2012/091842, U. S. Published Patent Application No. 2005/0070634, U. S. Published Patent Application No. 2005/0209401, U. S. Published Patent Application 2006/0276601, EP-A-0 308 664, EP 1 498 441A, EP-A 1 728 825, EP-A 1 896 517, EP-A 1 916 269, EP-A 1 916 270, EP-A 1 916 272 and EP-A-1 916 285.

B-1 type tougheners are conveniently made in a process that includes the steps of forming an isocyanate-terminated polyether or diene rubber and capping the isocyanate groups with a phenol or polyphenol. The isocyanate-terminated polyether or diene rubber is conveniently made by reacting a hydroxyl- or amine-terminated polyether or hydroxyl- or amine-terminated diene rubber with an excess of a polyisocyanate to produce adducts that have urethane or urea groups and terminal isocyanate groups. If desired, the isocyanate-terminated polyether or diene rubber can be chain-extended and/or branched prior to performing the capping reaction.

The polyether portion of the isocyanate-terminated polyether may be a polymer or copolymer of one or more of tetrahydrofuran (tetramethylene oxide), 1,2-butylene oxide, 2,3-butylene oxide, 1,2-propylene oxide and ethylene oxide, with polymers or copolymers of at least 70 weight-%, based on the total weight of the polymer or copolymer, of one or more tetrahydrofuran, 1,2-butylene oxide, 2,3-butylene oxide and 1,2-propylene oxide being preferred. Polymers of at least 80 weight-% tetrahydrofuran, based on the total weight of the polymer or copolymer, are especially preferred.

The isocyanate-terminated polyether is conveniently prepared by the reaction of a hydroxyl- and/or amine-terminated polyether with a polyisocyanate, at a ratio of at least 1.5 equivalents, preferably 1.8 to 2.5 equivalents or 1.9 to 2.2 equivalents, of polyisocyanate per equivalent of hydroxyl and/or primary or secondary amino groups on the starting polyether. The starting polyether preferably has 2 to 3, more preferably 2, hydroxyl and/or primary or secondary amino groups per molecule. The polyisocyanate preferably has 2 isocyanate groups per molecule. The isocyanate-terminated polyether preferably has 2 to 3, more preferably 2, isocyanate groups per molecule. The starting polyether preferably has a number average molecular weight of 900 to 800, more preferably 1500 to 6000 or 1500 to 4000. The polyisocyanate preferably has a molecular weight of up to 300.

The isocyanate-terminated diene polymer is conveniently prepared by the reaction of a starting hydroxyl- or amine-terminated diene polymer with a polyisocyanate, at a ratio of at least 1.5 equivalents, preferably 1.8 to 2.5 equivalents or 1.9 to 2.2 equivalents, of polyisocyanate per equivalent of hydroxyl groups on the starting diene polymer.

The starting diene polymer preferably has a glass transition temperature, prior to reaction with the polyisocyanate, of no greater than −20° C. and preferably no greater than −40° C. The diene polymer is a liquid homopolymer or copolymer of a conjugated diene, especially a diene/nitrile copolymer. The conjugated diene is preferably butadiene or isoprene, with butadiene being especially preferred. The preferred nitrile monomer is acrylonitrile. Preferred copolymers are butadiene-acrylonitrile copolymers. The rubbers preferably contain, in the aggregate, no more than 30 weight percent polymerized unsaturated nitrile monomer, and preferably no more than about 26 weight percent polymerized nitrile monomer.

The starting diene polymer preferably has 2 to 3, more preferably 2, hydroxyl and/or primary or secondary amino groups per molecule. The polyisocyanate preferably has 2 isocyanate groups per molecule. The isocyanate-terminated diene polymer preferably has 2 to 3, more preferably 2, isocyanate groups per molecule. The starting diene polymer preferably has a number average molecular weight of 900 to 800, more preferably 1500 to 6000 and still more preferably 2000 to 3000. The polyisocyanate preferably has a molecular weight of up to 300.

The isocyanate-terminated polyether and isocyanate-terminated diene polymer can have aromatic or aliphatic isocyanate groups. When the isocyanate-terminated polymers are made in the process described above, the polyisocyanate may be an aromatic polyisocyanate such toluene diamine or 2,4'- and/or 4,4'-diphenylmethane diamine, or an aliphatic polyisocyanate such as isophorone diisocyanate, 1,6-hexamethylene diisocyanate, hydrogenated toluene diisocyanate, hydrogenated methylene diphenylisocyanate ($H_{12}MDI$), and the like.

The reaction to form the isocyanate-terminated polymers can be performed by combining the starting polyether or diene rubber with the polyisocyanate and heating to 60 to 120° C., optionally in the presence of a catalyst for the reaction of isocyanate groups with the isocyanate-reactive groups of the polyether or diene polymer. The reaction is continued until the isocyanate content is reduced to a constant value or to a target value, or until the amino- and or hydroxyl groups of the starting polyether or diene polymer are consumed.

If desired, branching can be performed by adding a branching agent into the reaction between the starting polyether or diene polymer and the polyisocyanate. The branching agent, for purposes of this invention, is a polyol or polyamine compound having a molecular weight of up to 599, preferably from 50 to 500, and at least three hydroxyl, primary amino and/or secondary amino groups per molecule. If used at all, branching agents generally constitute no more than 10%, preferably no more than 5% and still more preferably no more than 2% of the combined weight of the branching agent and the starting polyether or diene polymer. Examples of branching agents include polyols such as trimethylolpropane, glycerin, trimethylolethane, ethylene glycol, diethylene glycol, propylene glycol, dipropylene glycol, sucrose, sorbitol, pentaerythritol, triethanolamine, diethanolamine and the like, as well as alkoxylates thereof having a number average molecular weight of up to 599, especially up to 500.

Chain extension can be performed if desired by reacting the isocyanate-terminated polyether or diene polymer with a chain extender before performing the capping step. Chain extenders include polyol or polyamine compounds having a molecular weight of up to 749, preferably from 50 to 500, and two hydroxyl, primary amino and/or secondary amino groups per molecule. Examples of suitable chain extenders include aliphatic diols such as ethylene glycol, diethylene glycol, triethylene glycol, propylene glycol, dipropylene glycol, tripropylene glycol, 1,4-butanediol, 1,6-hexane diol, cyclohexanedimethanol and the like; aliphatic or aromatic diamines such as ethylene diamine, piperazine, aminoethylpiperazine, phenylene diamine, diethyltoluenediamine and the like, and compounds having two phenolic hydroxyl groups such resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol and o,o'-diallyl-bisphenol A, and the like. Among these, the compounds having two phenolic hydroxyl groups are preferred.

The isocyanate groups of the isocyanate-terminated polyether or diene polymer are then capped by reaction with a capping agent. At least 90% of the isocyanate groups, more preferably at least 95% of the isocyanate groups, are capped with a monophenol or polyphenol. Examples of monophenols include phenol, alkyl phenols that contain one or more alkyl groups that each may contain from 1 to 30 carbon atoms, a halogenated phenol, cardanol, or naphthol. Suitable polyphenols contain two or more, preferably two, phenolic hydroxyl groups per molecule and include resorcinol, catechol, hydroquinone, bisphenol, bisphenol A, bisphenol AP (1,1-bis(4-hydroxylphenyl)-1-phenyl ethane), bisphenol F, bisphenol K, bisphenol M, tetramethylbiphenol and o,o'-diallyl-bisphenol A, as well as halogenated derivatives thereof. Up to 10%, preferably at most 5%, of the isocyanate groups may be capped with other capping agents such as amine, benzyl alcohol, hydroxy-functional acrylate or methacrylate compounds, thiol compounds, alkyl amide compounds having at least one amine hydrogen such as acetamide and ketoxime compounds.

The capping reaction can be performed under the general conditions described already, i.e., by combining the materials in the stated ratios and allowing them to react at room temperature or an elevated temperature such as 60 to 120° C., optionally in the presence of a catalyst for the reaction of isocyanate groups with the isocyanate-reactive groups of the capping agent. The reaction is continued until the isocyanate content is reduced to a constant value, which is preferably less than 0.1% by weight. Fewer than 3%, preferably fewer than 1%, of the isocyanate groups may remain uncapped.

The resulting toughener (Component B-1) suitably has a number average molecular weight of at least 3000, preferably at least 4,000, to about 35,000, preferably to about 20,000 and more preferably to about 15,000, as measured by GPC, taking into account only those peaks that represent molecular weights of 1000 or more.

The polydispersity (ratio of weight average molecular weight to number average molecular weight) of Component B-1 is suitably from about 1 to about 4, preferably from about 1.5 to 2.5. The toughener suitably contains, on average, from about 1.5, preferably from about 2.0, to about 6, preferably to about 4, more preferably to about 3 and still more preferably to about 2.5, capped isocyanate groups per molecule. An especially preferred prepolymer contains an average of from 1.9 to 2.2 capped isocyanate groups per molecule.

The core-shell rubber (Component B-2) is a particulate material having a rubbery core. The rubbery core preferably has a $T_g$ (by DSC) of less than −20° C., more preferably less than −50° C. and even more preferably less than −70° C. The $T_g$ of the rubbery core may be below −100° C. The core-shell rubber also has at least one shell portion that preferably has a $T_g$ of at least 50° C. The core of the core-shell rubber may be a polymer or copolymer of a conjugated diene such as butadiene, or a lower alkyl acrylate such as n-butyl-, ethyl-, isobutyl- or 2-ethylhexylacrylate, or may be a silicone rubber. The shell polymer, which is optionally chemically grafted or crosslinked to the rubber core, is preferably polymerized from at least one lower alkyl methacrylate such as methyl-, ethyl- or t-butyl methacrylate. Homopolymers of such methacrylate monomers can be used. Further, up to 40% by weight of the shell polymer preferably is formed from other monovinylidene monomers such as styrene, vinyl acetate, vinyl chloride, methyl acrylate, ethyl acrylate, butyl acrylate, and the like. The molecular weight of the grafted shell polymer may be, for example, between 20,000 and 500,000. The core-shell rubber may be provided in the form of a dispersion of the rubber particles in a carrier, such as an epoxy resin. Examples of useful core-shell rubbers include those described in EP 1 632 533 A1 and those sold by Kaneka Corporation under the designation Kaneka Kane Ace, including Kaneka Kane Ace MX 156 and Kaneka Kane Ace MX 120 core-shell rubber dispersions.

A rubber-modified epoxy resin (Component B-3) for purposes of this invention is a compound having at least two epoxide groups separated by an aliphatic chain of at least 300 g/mol, preferably at least 500 g/mol. The aliphatic chain may be, for example, an alkylene group; an alkenyl group; a diene polymer or copolymer; or a polyether such as a polypropylene oxide), a poly(ethylene oxide) or a copolymer of propylene oxide and ethylene oxide. The rubber-modified epoxy resin may have, prior to curing, a glass transition temperature of −20° C. or lower, preferably −30° C. or lower.

One useful type of rubber-modified epoxy resin is an epoxy-terminated polyether, which contains one or more polyether segments that each has a weight of at least 300 g/mol, preferably at least 500 g/mol. The polyether segment (s) each may have a weight of up to 10,000, up to 3,000 or up to 2,000 g/mol. One type of useful epoxy-terminated polyether is a diglycidyl ether of a polyether diol. The polyether diol may be, for example, a polypropylene oxide), a poly(ethylene oxide), or a propylene oxide/ethylene oxide copolymer. Commercially available epoxy-terminated polyethers that are useful include those sold as D.E.R.® 732 and D.E.R.® 736 by Olin Corporation.

A second useful type of rubber-modified epoxy resin is a reaction product of any of the non-rubber-modified epoxy resins described before with at least one liquid rubber that has epoxide-reactive groups, such as amino or preferably carboxyl groups. The resulting adduct has reactive epoxide groups that allow the adduct to react further when the structural adhesive is cured. It is preferred that at least a portion of the liquid rubber has a glass transition temperature ($T_g$) of −40° C. or lower, especially −50° C. or lower, as measured by differential scanning calorimetry (DSC). Preferably, the rubber has a glass transition temperature of −25° C. or lower. The rubber $T_g$ may be as low as −100° C. or even lower.

An example of this second type of rubber-modified epoxy resin is a reaction product of an amine-terminated polyether and an excess of a polyepoxide. The polyepoxide caps the amino groups of the amine-terminated polyether and forms free epoxide groups on the reaction product. The amine-terminated polyether preferably has 2 or 3 amino groups per molecule, prior to reaction with the polyepoxide. The amine-terminated polyether may have a weight of at least 300 g/mol, preferably at least 500 g/mol, up to 10,000, up to 3,000 or up to 2,000 g/mol. The polyepoxide may be any of the non-rubber modified epoxy resins mentioned above, among which the glycidyl ethers of polyphenols are preferred.

The second type of rubber-modified epoxy resin may be a reaction product of an excess of a polyepoxide with a homopolymer or copolymer of a conjugated diene, especially a diene/nitrile copolymer. The conjugated diene is preferably butadiene or isoprene, with butadiene being especially preferred. The preferred nitrile monomer is acrylonitrile. Preferred copolymers are butadiene-acrylonitrile copolymers. The rubbers preferably contain, in the aggregate, no more than 30 weight percent polymerized unsaturated nitrile monomer, and preferably no more than about 26 weight percent polymerized nitrile monomer. The rubber preferably contains from about 1.5, more preferably from about 1.8, to about 2.5, more preferably to about 2.2, of epoxide-reactive terminal groups per molecule, on average. Carboxyl-terminated rubbers are preferred. The molecular weight ($M_n$) of the rubber (prior to reaction with the polyepoxide) is suitably from about 2000 to about 6000, more preferably from about 3000 to about 5000.

Suitable carboxyl-functional butadiene and butadiene/acrylonitrile rubbers are commercially available from Noveon under the tradenames Hycar® 2000X162 carboxyl-terminated butadiene homopolymer, Hycar® 1300X31, Hycar® 1300X8, Hycar® 1300X13, Hycar® 1300X9 and Hycar® 1300X18 carboxyl-terminated butadiene/acrylonitrile copolymers. A suitable amine-terminated butadiene/acrylonitrile copolymer is sold under the tradename Hycar® 1300X21.

Other rubber-modified epoxy resins include epoxidized fatty acids (which may be dimerized or oligomerized), and elastomeric polyesters that are modified to contain epoxy groups.

The epoxy curing catalyst (Component C) is one or more materials that catalyze the reaction of the epoxy resin(s) with the curing agent. It is preferably encapsulated or otherwise a latent type that becomes active only upon exposure to elevated temperatures. Among preferred epoxy catalysts are ureas such as p-chlorophenyl-N,N-dimethylurea (Monuron), 3-phenyl-1,1-dimethylurea (Phenuron), 3,4-dichlorophenyl-N,N-dimethylurea (Diuron), N-(3-chloro-4-methylphenyl)-N',N'-dimethylurea (Chlortoluron), tert-acryl- or alkylene amines like benzyldimethylamine, 2,4,6-tris(dimethylaminomethyl)phenol, piperidine or derivatives thereof, various aliphatic urea compounds such as are described in EP 1 916 272; $C_1$-$C_{12}$ alkylene imidazole or N-arylimidazoles, such as 2-ethyl-2-methylimidazol, or N-butylimidazol and 6-caprolactam. 2,4,6-tris(dimethylaminomethyl)phenol integrated into a poly(p-vinylphenol) matrix (as described in European patent EP 0 197 892), or 2,4,6-tris(dimethylaminomethyl) phenol integrated into a novolac resin, including those described in U.S. Pat. No. 4,701,378, are suitable.

The curing agent (Component D) is a mixture of dicyandiamide and a dihydrazide. The dihydrazide corresponds to a reaction product of an organic dicarboxylic acid with a hydrazine. It preferably has a melting temperature of at least 120° C. or at least 140° C. The dihydrazide may be, for example, adipic dihydrazide, stearic dihydrazide, terephthalic dihydrazide or isophthalic dihydrazide.

The dicyandiamide and dihydrazide are present in a weight ratio of 1:99 to 99:1. A preferred weight ratio is 65:35 to 99:1. More preferred ratios are 50:50 to 95:5, 60:40 to 95:5, or 60:40 to 90:10.

Component A may constitute, for example, at least 30%, at least 40%, at least 50% or at least 55% of the combined weights of components A-D. Component A may constitute, for example, up to 90%, up to 85%, up to 75%, up to 70%, up to 65% or up to 60% of the combined weights of components A-D.

Component B preferably is present in an amount sufficient to provide the adhesive with a rubber content of 1 to 50%, based on the combined weights of components A-D. A preferred rubber content is at least 5%, at least 10% or at least 15% up to at most 40%, up to at most 35% or up to at most 30%, on the same basis, and more preferably from 8 to 15 weight percent of the structural adhesive.

Total rubber content for purposes of this invention is the ratio of the weight of the component B material(s) to the combined weight of Components A-D. In some cases, one or more Component B materials may be provided in the form of a mixture with one or more other materials. Those other materials are not counted toward the weight of the component B materials. The weight of those other materials are counted toward the combined weight of Components A-D only to the extent those other materials qualify as Component A, C or D materials.

Thus, for example, if a core-shell rubber product is supplied as a dispersion of 40% rubber particles in 60% of an epoxy resin, 40% of the total weight of the product counts toward the weight of Component B materials and the remaining weight counts toward the weight of Component A materials. Similarly, a rubber-modified epoxy resin is often supplied in the form of a mixture with excess epoxy resin. The excess epoxy resin counts toward the weight of Component A.

Each of Components B-1, B-2 and B-3 (when present) may constitute 1 to 50 percent of the total weight of components A-D.

In a specific embodiment, Component B is a mixture of at least one B-1 and at least B-3 material. In such embodiments the B-1 material may constitute 10 to 30 percent of the total weight of components A-D and the B-3 material may constitute 1 to 10 percent of the total weight of components A-D.

In another specific embodiment, Component B is a core-shell rubber in which the rubber particles constitute 10 to 30 percent of the total weight of components A-D.

The weight of Component C may constitute, for example, at least 0.1 percent, at least 0.25 percent or at least 0.5 percent of the total weight of components A-D, and may constitute, for example, up to 5 percent, up to 3 percent or up to 2 percent of the total weight of components A-D.

Component D may constitute, for example, at least 1 percent, at least 2 percent, at least 3 percent or at least 4 percent of the total weight of components A-D, and may constitute, for example up to 12 percent, up to 10%, or up to 9% thereof.

The weight of components A-D may constitute, for example, 30 to 100%, 50 to 100%, 50 to 90% or 50 to 85% of the total weight of the adhesive. If components A-D constitute less than 100% of the total weight of the adhesive, the adhesive will also contain one or more optional ingredients.

The adhesive may contain one or more mineral fillers. These can perform several functions, such as (1) modifying the rheology of the adhesive in a desirable way, (2) reducing overall cost per unit weight, (3) absorbing moisture or oils from the adhesive or from a substrate to which it is applied, and/or (4) promoting cohesive, rather than adhesive, failure. Examples of suitable mineral fillers include calcium carbonate, calcium oxide, talc, carbon black, textile fibers, glass particles or fibers, aramid pulp, boron fibers, carbon fibers, mineral silicates, mica, powdered quartz, hydrated aluminum oxide, bentonite, wollastonite, kaolin, fumed silica, silica aerogel, polyurea compounds, polyamide compounds or metal powders such as aluminum powder or iron powder. Another filler of particular interest is a microballoon having an average particle size of up to 200 microns and density of up to 0.2 g/cc. The particle size is preferably about 25 to 150 microns and the density is preferably from about 0.05 to about 0.15 g/cc. Heat expandable microballoons which are suitable for reducing density include those commercially available from Dualite Corporation under the trade designation Dualite™, and those sold by Akzo Nobel under the trade designation Expancel™.

All or part of the mineral filler may be in the form of fibers having a diameter of 1 to 50 μm (D50, as measured by microscopy) and an aspect ratio of 6 to 20. The diameter of the fibers may be 2 to 20 μm or 2 to 10 μm, and the aspect ratio may be 8 to 20 or 8 to 16. The diameter of the fiber is taken as that of a circle having the same cross-sectional area as the fiber. The aspect ratio of the fibers may be 6 or more, such as 6 to 25, 6 to 20, 8 to 20 or 8 to 15.

Alternatively, all or part of the mineral filler may be in the form of low aspect ratio particles having an aspect ratio of 5 or less, especially 2 or less, and a longest dimension of up to 100 μm, preferably up to 25 μm.

The mineral filler(s), if present, may constitute, for example, 1 to 40% of the total weight of the adhesive composition. In some embodiments, it constitutes at least 5% or at least 10% of the weight of the adhesive composition, and may constitute, for example, up to 35% of the weight thereof. If the mineral fillers include fumed silica, the adhesive may contain up to 10% by weight, preferably 1 to 6% by weight of fumed silica. Fumed silica may be present together with one or more other mineral fillers.

A monomeric or oligomeric, addition polymerizable, ethylenically unsaturated material is optionally present in the adhesive composition. This material should have a molecular weight of less than about 1500. This material may be, for example, an acrylate or methacrylate compound, an unsaturated polyester, a vinyl ester resin, or an epoxy adduct of an unsaturated polyester resin. A free radical initiator can be included in the adhesive composition as well, in order to provide a source of free radicals to polymerize this material. The inclusion of an ethylenically unsaturated material of this type provides the possibility of effecting a partial cure of the adhesive through selective polymerization of the ethylenic unsaturation.

The adhesive composition can further contain other additives such as dimerized fatty acids, diluents, plasticizers, extenders, pigments and dyes, fire-retarding agents, thixotropic agents, expanding agents, flow control agents, adhesion promoters and antioxidants. Suitable expanding agents include both physical and chemical type agents. The adhesive may also contain a thermoplastic powder such as polyvinylbutyral or a polyester polyol, as described in WO 2005/118734.

The adhesive is a one-component adhesive in which the foregoing components are mixed together prior to being applied and cured. The method of combining the ingredients is not particularly critical, provided that temperatures are low enough that premature curing does not take place. The formulated adhesive can be stored at a temperature of, for example, up to 100° C., up to 80° C., up to 60° C. or up to 40° C. for a period of at least one day prior to being applied and cured.

The adhesive preferably has a curing onset temperature of at least 130° C. but no greater than 155° C. Preferably the curing onset temperature is at least 133° C., or at least 140° C., and it may be no greater than 165° C., no greater than 160° C. or no greater than 150° C. Curing onset temperature for purposes of this invention is measured by differential scanning calorimetry (DSC) using a heating rate of 10° C./minute. The curing onset temperature is at the intersection of the temperature axis with a line tangent to the midpoint (half-height) of the upslope of the heat flow curve.

The adhesive preferably exhibits a peak exotherm temperature of 150 to 170° C., as measured by DSC. The peak exotherm is the temperature at which the exothermic heat flow reaches its peak.

The foregoing adhesive composition is formed into a layer at a bondline between two substrates to form an assembly, and the adhesive layer is cured at the bondline to form a cured adhesive bonded to each of the two substrates.

The adhesive can be applied to the substrates by any convenient technique. It can be applied cold or be applied warm if desired. It can be applied manually and/or robotically, using for example, a caulking gun, other extrusion apparatus, or jet spraying methods. Once the adhesive composition is applied to the surface of at least one of the substrates, the substrates are contacted such that the adhesive is located at a bondline between the substrates.

After application, the adhesive is cured by heating it to at or above its curing temperature. Although lower temperatures can be used in some instances, particularly when longer curing times can be tolerated, it is generally preferable to perform the curing step by heating the adhesive to at least 130° C. The heating temperature may be as high as 220° C. or more, but as an advantage of this invention is the lower curing onset temperature, the curing temperature preferably is up to 200° C., up to 180° C., up to 170° C. or up to 165° C.

The adhesive of the invention can be used to bond a variety of substrates together including wood, metal, coated metal, aluminum, a variety of plastic and filled plastic substrates, fiberglass and the like. In one preferred embodiment, the adhesive is used to bond parts of automobiles together or to bond automotive parts onto automobiles. Such parts can be steel, coated steel, galvanized steel, aluminum, coated aluminum, plastic and filled plastic substrates.

Because of the lower curing onset temperature of this adhesive, somewhat moderate curing temperatures can be used. This makes the adhesive particularly useful in bonding different substrates together. Substrates having significantly different CLTEs often exhibit greatly different amounts of expansion and contraction during the curing step and when the bonded assembly is cooled after curing. This can lead to adhesive failure and/or distortion in the finished part. This problem is especially significant when the curing is performed at very high temperatures. The ability to cure the adhesive of the invention at somewhat lower temperatures reduces stresses caused by the different amount of expansion and contraction, and can reduce incidences of adhesive failure and distortion caused thereby.

The different substrates may have coefficients of linear thermal expansion (CLTEs) that are different from each other by at least $5 \times 10^{-6}$ m/m-K, at least $10 \times 10^{-6}$ m/m-K or at least $20 \times 10^{-6}$ m/m-K, as measured by ASTM E831.

Examples of substrate pairings include pairings of different metals such as steel and aluminum; steel and magnesium; and aluminum and magnesium; pairings of a metal such as steel, magnesium, aluminum or titanium with a polymeric material such as thermoplastic organic polymer or a thermoset organic polymer; and pairing of a metal such as steel aluminum, magnesium or titanium and a fiber composite such as a carbon-fiber composite or a glass fiber composite.

An application of particular interest is bonding of automotive or other vehicular frame components to each other or to other components. The components to be bonded may include unlike materials that have differing CLTEs as described before.

Assembled automotive and other vehicular frame members often are coated with a coating material that requires a bake cure. The coating is typically baked at temperatures that may range from 160° C. to as much as 210° C. In such cases, it is often convenient to apply the adhesive to the frame components, then apply the coating, and cure the adhesive at the same time the coating is baked and cured. Between the steps of applying the adhesive and applying the coating, the assembly may be fastened together to maintain the substrates and adhesive in a fixed position relative to each other until the curing step is performed. Mechanical means can be used as a fastening device. These include, for example, temporary mechanical means such as various types of clamps, bands and the like, which can be removed once the curing step is completed. The mechanical fastening means can be permanent, such as, for example, various types of welds, rivets, screws, and/or crimping methods. Alternatively or in addition, the fastening can be done by spot-curing one or more specific portions of the adhesive composition to form one or more localized adhesive bonds between the substrates while leaving the remainder of the adhesive uncured until a final curing step is performed after the coating is applied. Lower curing temperatures, such as 140° C. to 200° C., 140° C. to 180° C., 140 to 175° C. or 140 to 165° C. can be used in such a process, due to the lower curing onset temperature of the adhesive of the invention.

The following examples are provided to illustrate the invention but are not intended to limit the scope thereof. All parts and percentages are by weight unless otherwise indicated. All molecular weights are number averages unless otherwise indicated.

In the following examples:

The NRM (Non-Rubber-Modified) Epoxy Resin is a liquid diglycidyl ether of bisphenol A having an epoxy equivalent weight of about 187.

The RM (Rubber-Modified) Epoxy Resin is a carboxyl-terminated butadiene rubber capped with a diepoxide.

The Core-Shell Rubber is a dispersion of about 40% core-shell rubber particles in 60% of a non-rubber-modified epoxy resin.

The Toughener is a urethane group-containing elastomeric toughener containing bisphenol-blocked isocyanate groups. It is prepared using general methods as described, for example, in Example 19 of U.S. Pat. No. 5,278,257, by reacting a 2000 molecular weight polytetrahydrofuran with isophorone diisocyanate to form a urethane group-containing, isocyanate-terminated prepolymer, and then capping the isocyanate groups. Its number average molecular weight is less than 35,000.

The dicyandiamide is Amicure CG 1200G dicyandiamide, from Air Products.

The ADH is adipic acid dihydrazide, available as Technicure® ADH from A&C Catalysts.

The Adhesion Promoter is commercially available as RAM 1087 from Huntsman Corporation.

The Colorant is commercially available as Araldit DW blue 0135 from Huntsman Corporation.

CNSL is cashew nut shell liquid, sold as NC-700 by Cardolite.

The Fillers are a mixture of fumed silica, calcium oxide and calcium carbonate.

The glycidyl neodecanoate is available commercially as Cardura E-10 from Hexion.

The Catalyst is Omicure® U-52M, an aromatic substituted urea sold by Emerald Performance Material.

EXAMPLES 1-6 AND COMPARATIVE SAMPLES A AND B

One-component adhesive Examples 1-6 and Comparative Samples A and B are prepared by mixing ingredients as indicated in Table 1. DSC analysis is performed at 10° C./min from 0° C. to 250° C. to determine curing onset temperature, peak exotherm temperature and enthalpy of curing for the adhesive composition. The chamber is cooled to 0° C. and a second scan is performed at 10° C./min up to 200° C. to determine the glass transition temperature of the cured adhesive.

TABLE 1

| | Parts By Weight | | | | | | | |
|---|---|---|---|---|---|---|---|---|
| Ingredient | Comp. Sample A* | Ex. 1 | Ex. 2 | Ex. 3 | Ex. 4 | Ex. 5 | Ex. 6 | Comp. Sample B* |
| NRM Epoxy Resin | 52.90 | 52.59 | 52.29 | 51.99 | 51.69 | 51.10 | 50.81 | 48.32 |
| RM Epoxy Resin | 11.46 | 11.46 | 11.46 | 11.46 | 11.46 | 11.46 | 11.46 | 11.46 |

TABLE 1-continued

|  | Parts By Weight | | | | | | | |
|---|---|---|---|---|---|---|---|---|
| Ingredient | Comp. Sample A* | Ex. 1 | Ex. 2 | Ex. 3 | Ex. 4 | Ex. 5 | Ex. 6 | Comp. Sample B* |
| Toughener | 17.20 | 17.20 | 17.20 | 17.20 | 17.20 | 17.20 | 17.20 | 17.20 |
| Dicyandiamide | 5.10 | 4.76 | 4.42 | 4.08 | 3.75 | 3.09 | 2.77 | 0 |
| Adipic Acid Dihydrazide | 0 | 0.65 | 1.30 | 1.93 | 2.57 | 3.81 | 4.42 | 9.68 |
| Adhesion Promoter | 0.68 | 0.68 | 0.68 | 0.68 | 0.68 | 0.68 | 0.68 | 0.68 |
| Glycidyl neodecanoate | 1.13 | 1.13 | 1.13 | 1.13 | 1.13 | 1.13 | 1.13 | 1.13 |
| Colorant | 0.10 | 0.10 | 0.10 | 0.10 | 0.10 | 0.10 | 0.10 | 0.10 |
| CNSL | 0.50 | 0.50 | 0.50 | 0.50 | 0.50 | 0.50 | 0.50 | 0.50 |
| Fillers | 10.18 | 10.18 | 10.18 | 10.18 | 10.18 | 10.18 | 10.18 | 10.18 |
| Catalyst | 0.75 | 0.75 | 0.75 | 0.75 | 0.75 | 0.75 | 0.75 | 0.75 |
| DSC Results | | | | | | | | |
| Curing Onset Temp. | 166° C. | 161° C. | 156° C. | 148° C. | 145° C. | 144° C. | 143° C. | 161° C. |
| Peak Exotherm Temp. | 178° C. | 176° C. | 174° C. | 172° C. | 171° C. | 160° C. | 158° C. | 176° C. |
| Glass Transition Temp. | 110° C. | 101° C. | 102° C. | 103° C. | 97° C. | 97° C. | 98° C. | 112° C. |

*Not an example of this invention.

The combination of dicyandiamine and dihydrazide curing agents lead to a substantial lowering of curing onset temperature for each of Examples 1-6, compared to Comparative Sample A in all cases, and compared to Comparative Sample B in the cases of Examples 2 to 6. Peak exotherm temperature is also reduced significantly. The lower onset temperature means that curing commences earlier during the heating process, and accordingly proceeds for a longer time, even though the heating regimen in the same in all cases.

Lap shear specimens are made using 1.6 mm cold rolled steel coupons. The specimens are made by cleaning the coupons, sprinkling glass beads (0.254 mm diameter) onto one of the coupons, applying the adhesive sample, and then positioning the second coupon on top of the adhesive. The bonded area in each case is 25×12.7 mm, and the adhesive layer thickness is controlled by the glass beads to 0.254 mm. The test specimens are cured for 30 minutes at 140° C. and evaluated for lap shear strength in accordance with DIN ISO 1465. Testing is performed at 23° C. and a test speed of 12.7 mm/minute. Results are as indicated in Table 2.

TABLE 2

|  | Sample | | | | | | | |
|---|---|---|---|---|---|---|---|---|
|  | Comp. Sample A* | Ex. 1 | Ex. 2 | Ex. 3 | Ex. 4 | Ex. 5 | Ex. 6 | Comp. Sample B* |
| Lap Shear Strength (MPa) | 9.3 | 32.9 | 28.2 | 27.2 | 29.2 | 27.9 | 25.0 | 15.2 |

*Not an example of this invention.

These results show a dramatic increase in lap shear strength when the adhesives of the invention are cured at the somewhat low temperature of 140° C.

A qualitative cure test is performed on each of Comp. Samples A and B and Examples 1-6. 6 mm beads are applied to a panel and placed into a 140° C. preheated oven. At five minute intervals, a spatula is dragged through the beads and the beads are visually examined. Incomplete cure is indicated by this test if the spatula cuts through the bead, smears it or otherwise deforms it. After 25 minutes, all of Examples 1-6 have cured, whereas neither of the Comparative Samples has done so.

Storage stability is evaluated on Comparative Samples A and B and Example 1. The viscosity of each of the freshly prepared samples is measured at 38° C. using a 25 mm parallel plate viscometer at a shear rate of 3 $s^{-1}$. The samples are each aged in closed containers at 50° C., with samples being withdrawn periodically for viscosity testing. Results are as in Table 3.

TABLE 3

| Aging | 38° C. Viscosity (Pa · s) | | |
|---|---|---|---|
| Time (hr) | Comp. Sample A* | Ex. A | Comp. Sample B* |
| 0 | 107.0 | 105.9 | 138.3 |
| 51 | 108.6 | 105.6 | 146.5 |
| 119 | 141.4 | 145.1 | 309.4 |
| 219.5 | 275.5 | 331.7 | 540.5 |
| 310 | 383.5 | 407.1 | 5079 |

*Not an example of this invention.

As can be seen from the data in Table 3, the adhesive containing the dihydrazide curing agent (Comparative Sample B) has poor thermal stability on this test. Comparative Sample A demonstrates the good thermal stability obtained with dicyandiamide. Surprisingly, Example 1 exhibits a thermal stability very close to that of Comparative Sample A, despite the presence of the dihydrazide curing agent.

Impact peel testing is performed on Comparative Samples A and B and Example 4 as follows. The test coupons for the impact peel testing are 100 mm×20 mm with a bonded area of 30×20 mm. The adhesive sample is applied to the bond area of a 0.8 mm GMC-5E cold rolled steel coupon (ACT Laboratories) after cleaning the coupon with acetone. Another steel coupon is placed into contact with the adhesive and the assembly squeezed under a weight of about 10 kg to prepare each test specimen, with spacers present to maintain an adhesive layer thickness of 0.254 mm. The assembled test specimens are cured at 170° C. for 30 minutes. The impact peel testing is performed in accordance with the ISO 11343 wedge impact method. Testing is performed under a 90 Joule impact load at an operating speed of 2 m/sec with samples at a temperature of 23° C. or at −40° C., as indicated in Table 4.

In addition, lap shear strength is evaluated on these samples as indicated before, after a 170° C./30 minute cure.

Results of the testing are as indicated in Table 4.

TABLE 4

| Test | Comp. Sample A* | Ex. 4 | Comp. Sample B* |
|---|---|---|---|
| Impact Peel Strength, 23° C. (N/mm) | 36.8 | 33.3 | 15.9 |
| Impact Peel Strength, −40° C. (N/mm) | 18.4 | 21.4 | 5.0 |
| Lap Shear Strength (MPa) | 35.3 | 35.3 | 30.3 |

*Not an example of this invention.

The data in Table 4 shows that the adhesive of the invention exhibits good adhesion characteristics even at a higher temperature cure. The ability to cure the adhesive over a wide range of temperatures is a significant advantage in a manufacturing setting, where conditions may not always be closely controlled.

EXAMPLES 7-9 AND COMPARATIVE SAMPLES C AND D

One-component adhesive Examples 7-9 and Comparative Samples C and D are prepared by mixing ingredients as indicated in Table 5. DSC analysis is performed to determine curing onset temperature, peak exotherm temperature, and enthalpy of curing for the adhesive composition, and to determine the glass transition temperature of the cured adhesive.

TABLE 5

| | Parts By Weight | | | | |
|---|---|---|---|---|---|
| Ingredient | Comp. Sample C* | Ex. 7 | Ex. 8 | Ex. 9 | Comp. Sample D* |
| NRM Epoxy Resin | 33.70 | 33.00 | 32.32 | 31.67 | 31.05 |
| Core-Shell Rubber | 50 | 50 | 50 | 50 | 50 |
| Dicyandiamide | 2.96 | 2.17 | 1.42 | 0.70 | 0 |
| Adipic Acid Dihydrazide | 0 | 1.49 | 2.92 | 4.29 | 5.61 |
| Adhesion Promoter | 0.68 | 0.68 | 0.68 | 0.68 | 0.68 |
| Glycidyl neodecanoate | 1.13 | 1.13 | 1.13 | 1.13 | 1.13 |
| Colorant | 0.10 | 0.10 | 0.10 | 0.10 | 0.10 |
| CNSL | 0.50 | 0.50 | 0.50 | 0.50 | 0.50 |
| Fillers | 10.18 | 10.18 | 10.18 | 10.18 | 10.18 |
| Catalyst | 0.75 | 0.75 | 0.75 | 0.75 | 0.75 |
| DSC Results | | | | | |
| Curing Onset Temp. | 154° C. | 145° C. | 143° C. | 139° C. | 169° C. |
| Peak Exotherm Temp. | 164° C. | 156° C. | 156° C. | 168° C. | 178° C. |
| Enthalpy of Cure, J/g | 177 | 156 | 133 | 125 | 121 |
| Glass Transition Temp. | 107° C. | 95° C. | 83° C. | 72° C. | 70° C. |

*Not an example of this invention.

These systems toughened with a core-shell rubber exhibit generally exhibit lower curing onset and peak exotherm temperatures than those of Examples 1-6. Nonetheless, the combination of dicyandiamide and dihydrazide even in these cases results in a significant depression of both values.

What is claimed is:

1. A method for bonding two substrates, comprising forming a layer of an adhesive comprising in admixture A) at least one non-rubber-modified epoxy resin, B) at least one toughening agent, C) at least one epoxy curing catalyst and D) a curing agent mixture that includes dicyandiamide and one or more dihydrazide compounds, the dicyandiamide and one or more dihydrazide compounds being present at a weight ratio of 0.63 to 99:1, at a bondline between the two substrates to form an assembly and then curing the adhesive layer at the bondline by heating to a temperature of 130 to 165° C. to form a cured adhesive bonded to the two substrates at the bondline, wherein one of the substrates is a metal and the other substrate is a thermoplastic organic polymer, a thermoset organic polymer or a fiber composite.

2. The method of claim 1, wherein the two substrates have coefficients of linear thermal expansion that are different from each other by at least $5 \times 10^{-6}$ m/m-K.

3. A method for forming a bonded and coated assembly, comprising 1) forming a layer of the adhesive comprising in admixture A) at least one non-rubber-modified epoxy resin, B) at least one toughening agent, C) at least one epoxy curing catalyst and D) a curing agent mixture that includes dicyandiamide and one or more dihydrazide compounds, the dicyandiamide and one or more dihydrazide compounds being present at a weight ratio of 1:99 to 99:1 at a bondline between a first and a second substrate to form an assembly that includes the first and second substrates each in contact with the adhesive composition at the bondline; then 2) immersing the assembly into a coating bath to form a layer of an uncured coating on at least a portion of an exposed surface of the assembly; and 3) heating the assembly to a temperature of at least 130° C. to cure the adhesive to form a cured adhesive bonded to the substrates at the bondline and simultaneously cure the coating layer.

4. The method of claim 3 wherein the temperature is 130 to 175° C.

5. The method of claim 3 wherein the temperature is 133 to 165° C.

6. The method of claim 3, wherein the first and second substrates have coefficients of linear thermal expansion that are different from each other by at least $5 \times 10^{-6}$ m/m-K.

7. The method of claim 3, wherein one of the substrates is a metal and the other substrate is a thermoplastic organic polymer, a thermoset organic polymer or a fiber composite.

* * * * *